US012675376B2

(12) United States Patent
Abedigozalabad et al.

(10) Patent No.: US 12,675,376 B2
(45) Date of Patent: Jul. 7, 2026

(54) AUTOMATIC RECOVERY OF NODES WITH CORRUPTED LOGS IN A CONSENSUS PROTOCOL

(71) Applicant: Oracle International Corporation, Redwood Shores, CA (US)

(72) Inventors: Saeed Abedigozalabad, San Mateo, CA (US); Thakur Vishwesh Singh, Bengaluru (IN); Vijay Sridharan, Santa Clara, CA (US); Nilesh Choudhury, Redwood City, CA (US); Mehrnoosh Raoufi, Pittsburgh, PA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/607,307

(22) Filed: Mar. 15, 2024

(65) Prior Publication Data

US 2025/0291684 A1     Sep. 18, 2025

(51) Int. Cl.
*G06F 11/16*          (2006.01)
(52) U.S. Cl.
CPC .... *G06F 11/1658* (2013.01); *G06F 2201/805* (2013.01)
(58) Field of Classification Search
CPC ............. G06F 11/0709; G06F 11/1469; G06F 11/1471; G06F 11/1658; G06F 11/2097
See application file for complete search history.

(56) References Cited

U.S. PATENT DOCUMENTS 7,472,129 B2 * 12/2008 Adya ................. G06F 11/1482

OTHER PUBLICATIONS

Guo et al., "Accurate and efficient follower log repair for Raft-replicated database systems", Frontiers of Computer Science, vol. 15, Issue 2, Apr. 2021 (Year: 2021).*
Howard et al., "Paxos vs Raft: Have we reached consensus on distributed consensus?", Apr. 2020, Proceedings of the 7th Workshop on Principles and Practice of Consistency for Distributed Data (pp. 1-9). (Year: 2020).*
Alagappan, Ramnatthan et al., "Protocol-Aware Recovery for Consensus-Based Storage", 16TH Usenix Conference On File and Storage Technologies, pp. 15-31.

* cited by examiner

*Primary Examiner* — Michael Maskulinski
(74) *Attorney, Agent, or Firm* — Hickman Becker Bingham Ledesma LLP; Stephen R. Tkacs

(57)          ABSTRACT
The illustrative embodiments provide a consensus protocol with recovery of corrupted log entries within a log stored at a server within a cluster. Each server stores metadata comprising a last log index and a last log term of the copy of the log at the server. In response to a server having one or more corrupted log entries, the server makes a backup of the log and truncates log entries. The server then converts to a rescuee role. When an append entries call is received, the server uses the last log index and last log term from the metadata to determine whether the append entries call is received from a valid leader and can be appended to the truncated log. The server then applies one or more append entries calls to recover the corrupted log entries. Once the corrupted log entries are recovered, the server converts to the follower role.

20 Claims, 7 Drawing Sheets

S1

LOG
| x←3 | y←1 | | ... |

S5

LOG
| x←3 | y←1 | y←9 | |

CORRUPTED

S2

LOG
| x←3 | y←1 | y←9 | ... |

S4

LOG
| x←3 | | | ... |

S3

LOG
| x←3 | | | ... |

300 APPEND ENTRIES

301 UPDATE LAST LOG INDEX

302 UPDATE LAST LOG TERM

303 END

| LOG | T=1<br>I=1 | T=1<br>I=2 | ... | T=4<br>I=75 | T=4<br>I=76 | ... | T=6<br>I=100 | 410 |

| METADATA | | |
|---|---|---|
| Current Term = 6 | | 430 |
| Voted For = S2 | | |
| Rescuee Flag = FALSE | | |
| Last Log Index = 100 | | |
| Last Log Term = 6 | | |

Figure 9:
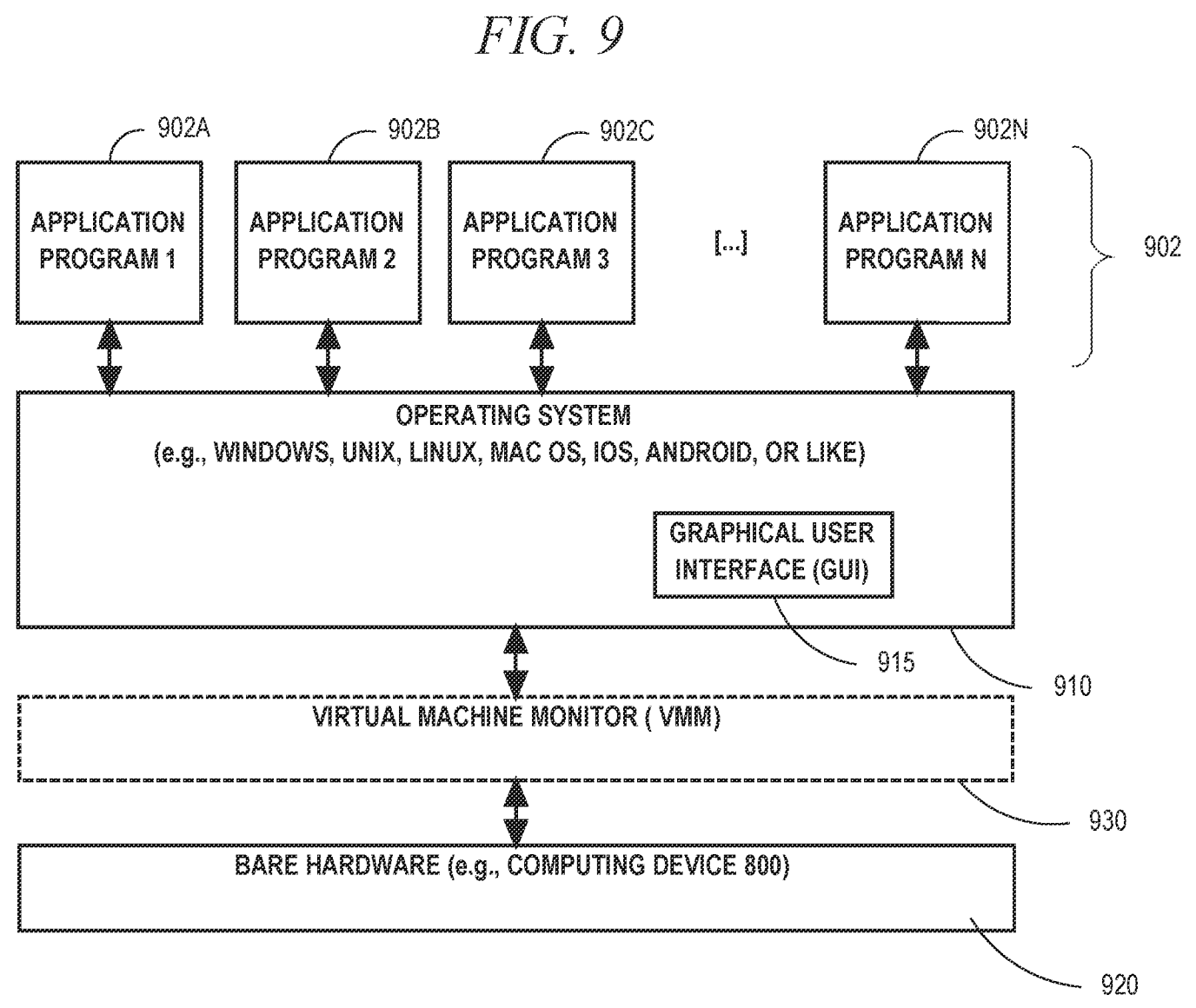

APPLICATION PROGRAM N

902C

APPLICATION PROGRAM 3

902B

APPLICATION PROGRAM 2

902A

APPLICATION PROGRAM 1

[...]

OPERATING SYSTEM
(e.g., WINDOWS, UNIX, LINUX, MAC OS, IOS, ANDROID, OR LIKE)

GRAPHICAL USER INTERFACE (GUI)

910

915

VIRTUAL MACHINE MONITOR (VMM)

930

BARE HARDWARE (e.g., COMPUTING DEVICE 800)

920

AUTOMATIC RECOVERY OF NODES WITH CORRUPTED LOGS IN A CONSENSUS PROTOCOL

FIELD OF THE INVENTION

The present invention relates to managing replication logs in a consensus protocol and, more particularly, to automatic recovery of corrupted replication log.

BACKGROUND

Consensus protocols allow a collection of machines to work as a coherent group that can survive the failures of some of its members. Because of this, variations of consensus protocols play a key role in large-scale software systems, such as replicated database systems. Raft is a consensus protocol that is designed to be understandable and simple to implement. Raft offers a generic way to distribute a state machine, or object store, across a cluster of servers or computing nodes, ensuring that each server that is a member of the cluster agrees upon the same series of state transitions. The replicated state machines are typically implemented using a replicated log. Each server stores a log replica containing a series of commands, which its state machine executes in order; thus, each state machine processes the same sequence of commands. Since the state machines are deterministic, each computes the same state and the same sequence of outputs.

Consensus protocols such as Raft exchange messages to reliably replicate data on a group of nodes. The leader node makes all changes and generates a log of the changes. The other nodes receive a copy of the log and apply the changes to their replica of the data. Each log record, or entry, must be persisted on a majority of servers to be committed. However, existing consensus protocols do not account for scenarios in which a server has a corrupted log. Corrupted entries in the replication log cannot simply be ignored because they may have already been committed. Furthermore, the consensus protocols use the log itself to determine whether a call to append entries is being received from a valid leader. If there is a corrupted entry in the log, then all subsequent entries are in doubt, because if the length of a log entry is in doubt, then the offset to the next log entry cannot confidently be determined.

If such a corruption happens, the server cannot rejoin the cluster, and manual intervention is required to recover the server. However, manual recovery can take a very long time, and requires manual intervention from an expert. Therefore, it would be beneficial to provide automatic recovery of a corrupted log in a consensus protocol.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 9 is a block diagram of a basic software system that may be employed for controlling the operation of a computer system.

DETAILED DESCRIPTION

Figure 1:
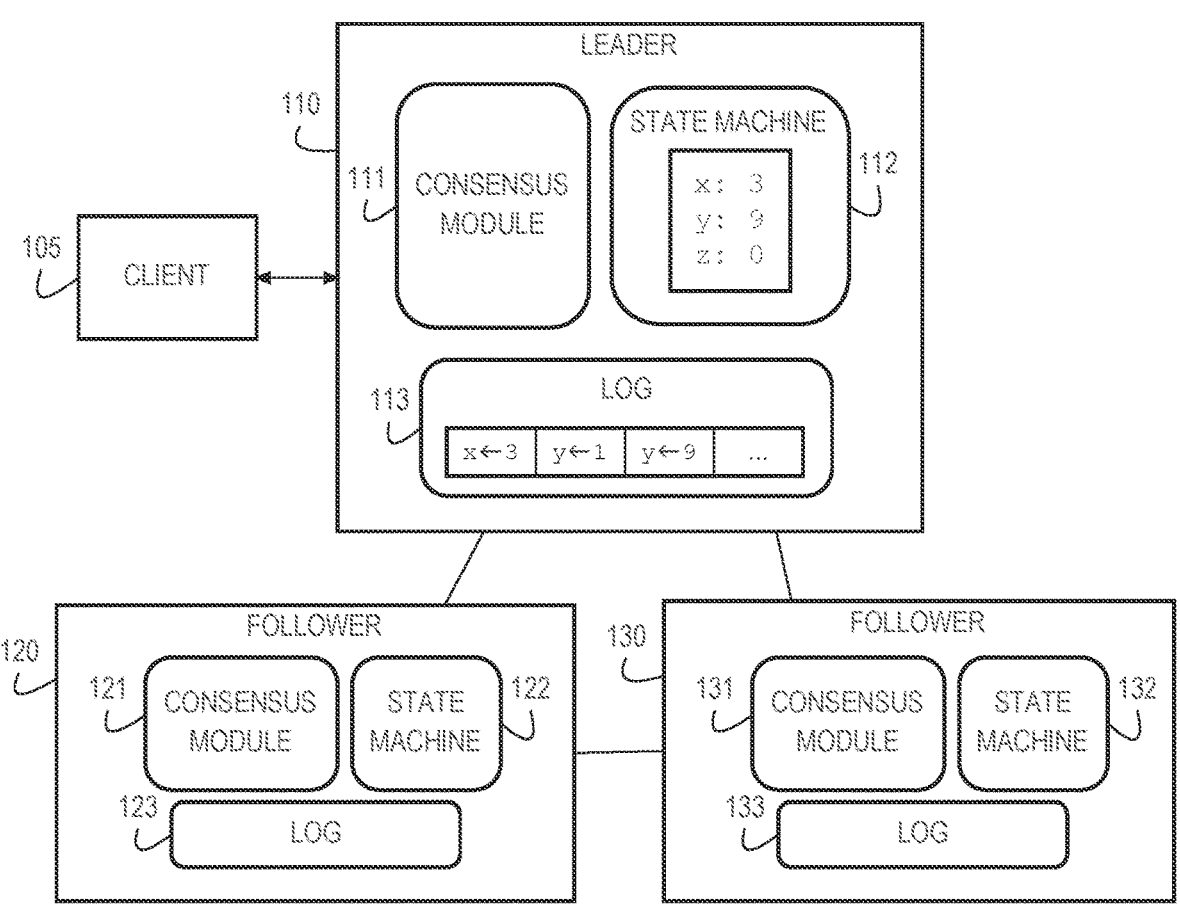
FIG. 1 is a block diagram illustrating a distributed computing system with a state machine replicated across a plurality of servers using a replication log in accordance with a consensus protocol in which aspects of the illustrative embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments provide a consensus protocol with recovery of corrupted log entries within a replication log stored at a server within a cluster of servers. If one or more entries of the log are corrupted, then the server cannot confidently determine the content of any subsequent log entries. More specifically, the last log index and the last log term, which are obtained from the last entry in the replication log, are used for appending entries and performing leadership elections in the consensus protocol. However, if one or more entries of the log are corrupted, then the server cannot determine the last log index and last log term from the log itself; therefore, each server stores metadata comprising a last log index and a last log term of the copy of the replication log at the server. In response to a server having one or more corrupted log entries in its replication log, the server makes a backup of the log and truncates log entries including the first corrupted entry and each subsequent entry in the replication log. The server then converts to a rescuee role. In one embodiment, a server does not start a leadership election or participate in a leadership election while in the rescuee role.

While in the rescuee role, the server listens for append entries calls from the leader. When an append entries call is received, the server uses the last log index and last log term from the metadata to determine whether the append entries call is received from a valid leader and can be appended to the truncated log. In one scenario, the append entries call is not as advanced as the last log index and last log term from the metadata, in which case, the server ignores the append entries call, because the server sending the call is not a valid leader. In another scenario, there is a gap between the last log index from the metadata and the log entries in the append entries call, in which case, the server sends an indication of the last log index to the leader, which fills the gap with a subsequent append entries call. In another scenario, the append entries call includes log entries from the last log index from the metadata and replaces log entries truncated from the replication log, in which case the server applies the new entries to the replication log. The server then applies the append entries call, or subsequent append entries call, to recover the corrupted log entries. Once the corrupted log entries are recovered, the server converts to the follower role.

The automated log recovery of the illustrative embodiments improves performance and availability of the replication cluster. The illustrative embodiments reduce the down time of servers with corrupted data by automatically recovering data the replication log without manual intervention. Automated recovery results in easier maintenance and reduces the risk of human error.

Raft Protocol

The illustrative embodiments are described with reference to the Raft consensus protocol; however, aspects of the illustrative embodiments can be applied to other consensus protocols, such as Paxos or Zookeeper Atomic Broadcast (ZAB). Raft is a consensus protocol for managing a replicated log. A Raft cluster or group contains several nodes, such as servers. For example, a typical Raft cluster may include five nodes, which allows the system to tolerate two failures. At any given time, each server is in one of three states: leader, follower, or candidate. In normal operation, there is exactly one leader, and all other participant nodes are followers. Followers respond to requests from leaders and candidates. The third state, candidate, is used to elect a new leader. Raft separates the key elements of consensus, such as leader election, log replication, and safety, and enforces a stronger degree of coherency to reduce the number of states that must be considered. The Raft consensus protocol is described in detail in "In Search of an Understandable Consensus Algorithm," by Diego Ongaro et al. published in the Proceedings of USENIX ATC '14:2014 USENIX Annual Technical Conference, Jun. 19-20, 2014, and "Consensus: Bridging Theory and Practice," by Diego Ongaro et al. published by Stanford University, 2014, which are hereby incorporated by reference as if fully set forth herein.

FIG. 1 is a block diagram illustrating a distributed computing system with a state machine replicated across a plurality of servers using a replication log in accordance with a consensus protocol in which aspects of the illustrative embodiments may be implemented. FIG. 1 illustrates a configuration of servers at a particular point in time at which server 110 is the leader and servers 120, 130 are followers. The server that is the leader will change over time; however, in the configuration shown in FIG. 1, server 110 is the current leader.

State machines 112, 122, 132 are replicas of the data being maintained by participant servers 110, 120, 130, respectively. In one embodiment, participant servers 110, 120, 130 may be implementing a DBMS and may manage state machines 112, 122, 132 in the form of tables, objects, documents, etc. For example, participant servers 110, 120, 130 may implement a relational database management system (RDBMS) that manages a collection of tables (or data frames). As another example, participant servers 110, 120, 130 may implement a document DBMS ("DOCS") that manages a collection of JSON objects.

In the example shown in FIG. 1, there is a leader server 110 and two follower servers 120, 130; however, the distributed computing system can include other numbers of servers depending on the configuration or workload. For example, the number of servers in the group of participant nodes can be scaled up or down depending on the workload or other factors that affect resource usage. Consensus protocols typically arise in the context of replicated state machines. As shown in FIG. 1, state machines 112, 122, 132 are replicated across a group of servers 110, 120, 130, respectively. State machines 112, 122, 132 operate to compute the same state and continue to operate even if one or more of the servers 110, 120, 130 are down.

Replicated state machines 112, 122, 132 are implemented using replicated logs. Each server 110, 120, 130 stores a log 113, 123, 133, respectively, containing a series of commands that are executed in order by its state machine 112, 122, 132. Each log should contain the same commands in the same order, so each state machine will process the same sequence of commands. Because the state machines 112, 122, 132 are deterministic, each computes the same state and the same sequence of outputs.

Keeping the replicated log consistent is the purpose of the consensus protocol. The consensus module 111 on a leader server 110 receives commands from clients, such as client 101, and adds them to its log 113. In some embodiment, followers 120, 130 can receive commands from a client (not shown). In one embodiment, when a follower 120, 130 receives an update request from a client, the follower sends a message to leader 110 to update the state machine and generate a log record. The leader returns the result of the command to the follower, which in turn returns the result to the client. In an alternative embodiment, leader 110 handles all client requests, and if a client contacts follower 120 or 130, the follower redirects the client to leader 110.

The consensus module 111 of leader server 110 communicates with the consensus modules 121, 131 of the follower servers 120, 130 to ensure that their logs 123, 133 eventually contain the same requests or commands in the same order, even if one or more nodes fail. Once commands are properly replicated, each server's state machine processes them in log order, and the outputs are returned to the client. As a result, the servers 110, 120, 130 appear to form a single, highly reliable state machine.

The Raft protocol divides time into leadership terms of arbitrary length. Terms are numbered with integers. Each term begins with an election, in which one or more candidates attempt to become leader. Different servers observe the transitions between leadership terms at different times, and in some situations a server may not observe an election or even entire terms. In the Raft protocol, terms act as a logical clock, and they allow servers to detect obsolete information, such as stale leaders. Each node stores a currentTerm number, which increases monotonically over time. Current terms are exchanged whenever servers communicate; if one server's currentTerm value is smaller than another's, then it updates its currentTerm to the larger value. If a candidate or leader discovers that its current term is out of date, then it immediately reverts to the follower state. If a server receives a request with a stale term number, it rejects the request.

In the Raft consensus protocol, servers communicate using remote procedure calls (RPCs), and the consensus protocol requires only two types of RPCs. RequestVote RPCs are initiated by candidates during elections, and AppendEntries RPCs are initiated by leaders to replicate log entries and provide a form of heartbeat. In the Raft protocol, RPCs include a term value as an argument. Any RPC with a term value that is less than the receiving server's current-Term is rejected. This ensures that only AppendEntries RPCs from the current leader are accepted in the current term.

Each log entry has a term and log index. Leader server 110 keeps track of the highest index it knows to be committed, and it includes that index in future AppendEntries RPCs (including heartbeats) so that the follower servers 120, 130 eventually learn the highest index for committed log entries. The "log tail" is the last log record that a server has received in its log. Once a follower server 120, 130 learns that a log entry is committed, it applies the entry to its local state machine 122, 132 in log order. When a follower server, such as follower 120, receives an AppendEntries RPC, the follower server 120 compares the received entries to that server's log 123 to determine if the new entries are more advanced than that server's log. If the new entries in the AppendEntries RPC are not more advanced than the server's log 123, then the server 120 returns a false result. If the new entries in the AppendEntries RPC are more advanced than the server's log 123, then the follower server 120 appends the new entries that are not already in the log 123.

Log Corruption

Figures 2, 3:
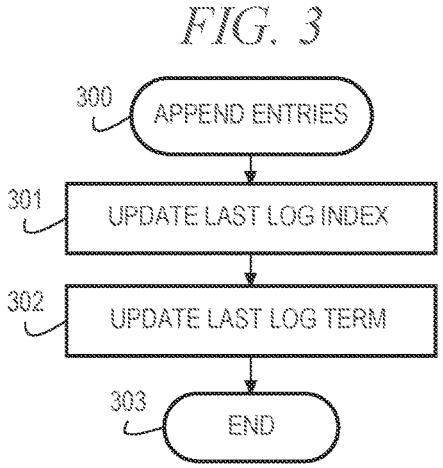
FIG. 2 is a block diagram illustrating a distributed computing system with a replication log in accordance with a consensus protocol in which aspects of the illustrative embodiments may be implemented.
FIG. 3 is a flowchart illustrating operation of updating metadata for a replication log in accordance with an illustrative embodiment.

FIG. 2 is a block diagram illustrating a distributed computing system with a replication log in accordance with a consensus protocol in which aspects of the illustrative embodiments may be implemented. In the depicted example, the server cluster includes five servers S1, S2, S3, S4, S5, each having a replication log. As seen in FIG. 2, server S2 has the most advanced log; therefore, server S2 is the leader, and servers S1, S3, S4, S5 are followers. When leader server S2 sends an AppendEntries RPC to the follower nodes, each node compares that server's log to the new entries to be appended.

A server may detect that its log is corrupted when performing processing at startup time or when applying changes, for example. In some embodiments, each log entry has a header with some information about the entry, such as a checksum or a length value. A checksum is a small-sized block of data derived from another block of digital data for the purpose of detecting errors that may have been introduced during its transmission or storage. As server S5 processes the entries in its log, the server can use the checksum to determine if the integrity of the data in the entry has been compromised. Alternatively or in addition, server S5 can examine the length value to determine if the length value is invalid or nonsensical. For example, a length of 10,000,000,000 bytes is not a valid length for a log entry. Other techniques for determining data corruption in the log may be used within the spirit and scope of the illustrative embodiments.

If server S5 determines that a log entry is corrupt, then server S5 cannot confidently determine the data in any subsequent log entry. In accordance with some embodiments, the length of entries in the log varies, and entries are added back-to-back. Thus, if entry X is corrupted in the log, then the length of entry X cannot be confidently known. It follows that the offset of entry (X+1) in the log file cannot be determined. Therefore, if any entry of the log is corrupt, then the server S5 cannot determine the term or log index of the last log entry. In the example shown in FIG. 2, server S5 determines that its log is corrupted; therefore, server S5 cannot process an incoming AppendEntries RPC without knowing the log index and term of the last entry in its log.

Metadata

In the Raft protocol, each server keeps a small amount of metadata, including the following: curentTerm indicating the last term the server has seen, and votedFor indicating the candidate identifier that received the server's vote in the currentTerm. In accordance with an illustrative embodiment, each server stores additional metadata including the last log index and last log term from its log. The server updates the last log index and last log term values each time a new entry is appended to the log and the server sends an acknowledgement to the leader.

FIG. 3 is a flowchart illustrating operation of updating metadata for a replication log in accordance with an illustrative embodiment. Operation begins with a server receiving an AppendEntries RPC from the leader and appending one or more log entries to the server's log (block 300). The server updates the last log index in the server's metadata to be equal to the log index of the last entry appended to the log (block 301). The server also updates the last log term in the server's metadata to be equal to the log term of the last entry appended to the log (block 302). This ensures the correct log term and log index are set in the metadata rather than relying on reading those values from a log that might be corrupt. Thereafter, operation ends (block 303).

Figures 4, 5:
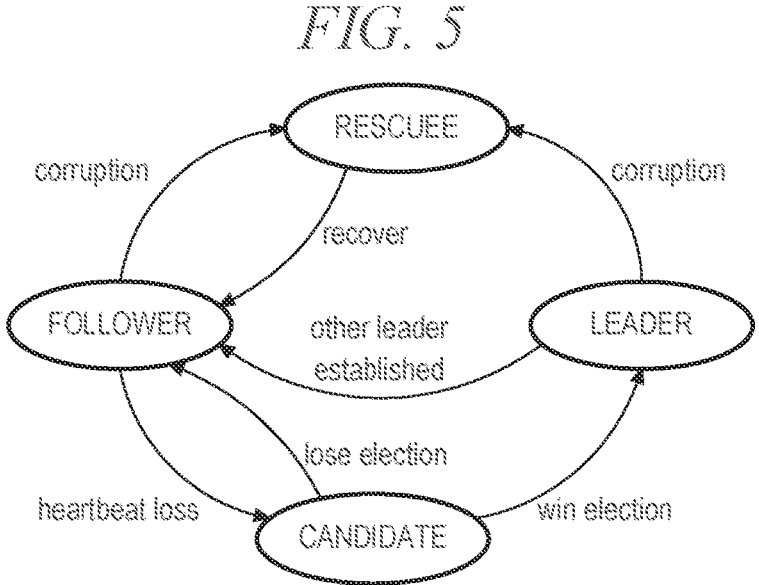
FIG. 4 illustrates a server updating metadata for a replication log in accordance with an illustrative embodiment.
FIG. 5 is a state transition diagram illustrating the transitions between roles in accordance with an illustrative embodiment.

FIG. 4 illustrates a server updating metadata for a replication log in accordance with an illustrative embodiment. As shown in FIG. 4, each entry of log 410 includes a term (T) and an index (I). In the depicted example, the last entry in log 410 has a term of 6 and a log index of 100. Thus, the server updates metadata 430 to set the last log index and last log term values to that of the last log entry in log 410.

As discussed above, if log 410 is corrupted, then the server cannot confidently determine the term and log index of the last entry. Thus, in accordance with an illustrative embodiment, if the server subsequently detects a corruption in log 410, the server can use the last log index and last log term from metadata 430 to determine if an AppendEntries RPC is received from a server whose log is more advanced than log 410.

Rescuee Role

In the Raft consensus protocol, at any given time, each server is in one of three states: leader, follower, or candidate. A server with a corrupted log cannot be the leader; otherwise, the server would replicate corrupted log entries to the followers. A server with a corrupted log also cannot initiate a leadership election; therefore, the server cannot be a candidate. In one embodiment, a server with a corrupted log also cannot vote in a leadership election. The illustrative embodiments provide a new rescuee role indicating that the server requires recovery of one or more corrupted log records.

In the example depicted in FIG. 4, the server has not detected a corruption in log 410. Therefore, the rescuee flag in metadata 430 is set to "FALSE." However, if the server subsequently detects a corruption in log 410, then the server will set the rescuee flag to "TRUE" to indicate that the server is in the rescuee role.

FIG. 5 is a state transition diagram illustrating the transitions between roles in accordance with an illustrative embodiment. Each server starts in the follower role. If the server fails to receive a heartbeat from a leader, then the server converts to the candidate role and initiates an election. If the server loses the election, then the server reverts to the follower role and either receives a heartbeat from a leader or initiates another election.

If the server wins the election, then the server converts to the leader role. If a new leader is established (e.g., the server receives an AppendEntries RPC from another server having a more advanced term and a log that is at least as advanced as the server's log), then the server converts to the follower role.

If a server in the follower role or leader role detects a corruption in its log, then the server converts to the rescuee role. If the leader converts to the rescuee role, then the follower servers will fail to receive a heartbeat from a leader and initiate an election. The follower server with the most advanced log will become leader. A server in the rescuee role does not initiate or vote in leadership elections. A server in the rescuee role listens to incoming RPCs coming from other nodes. If an AppendEntries RPC is received, the server attempts to recover the corrupt log entries. If the server recovers, then the server converts from the rescuee role to the follower role.

Automatic Recovery of Corrupted Log Entries

Figure 6:
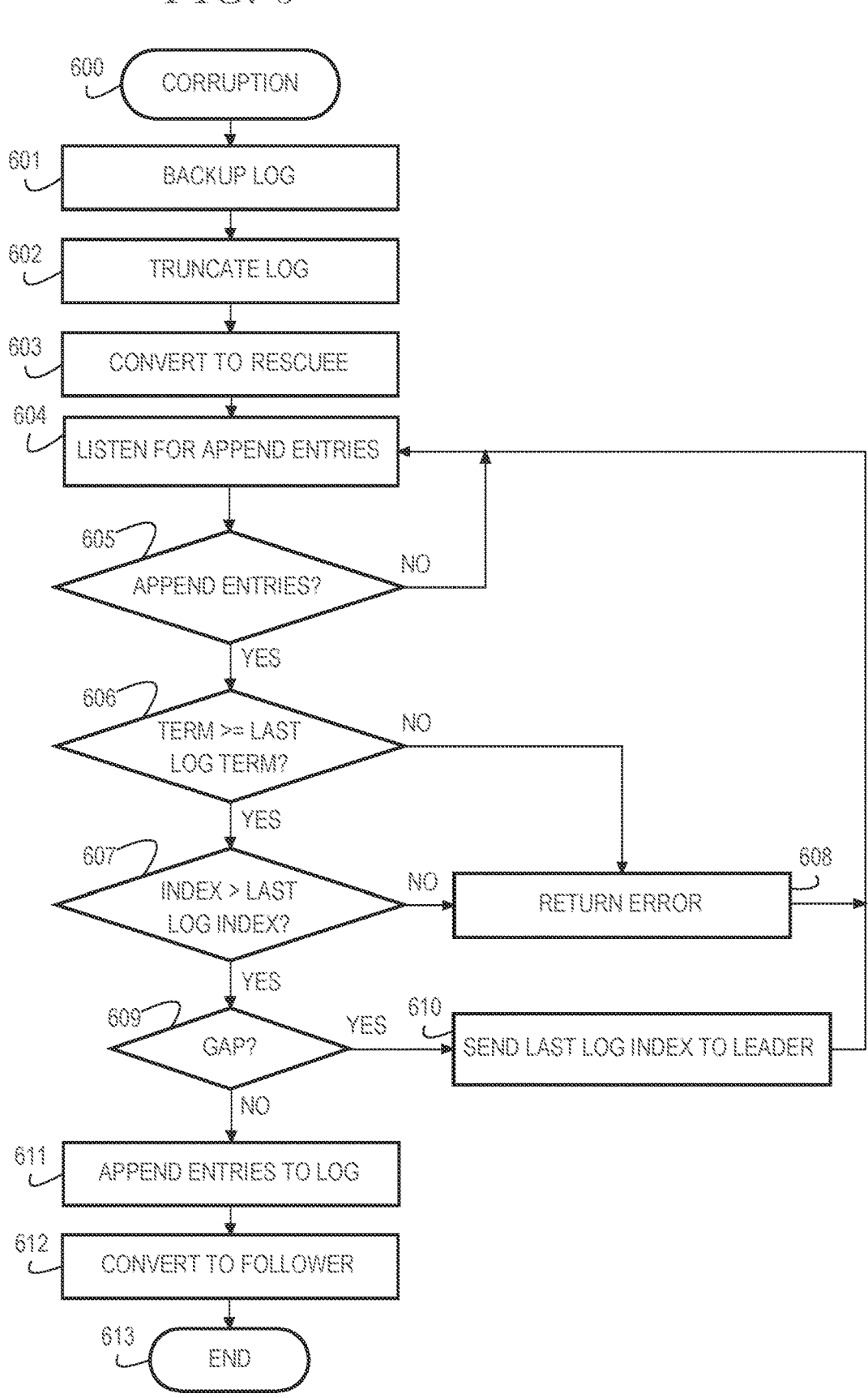
FIG. 6 is a flowchart illustrating operation of a server performing automatic recovery of corrupted log entries in accordance with an illustrative embodiment.
Figure 7:
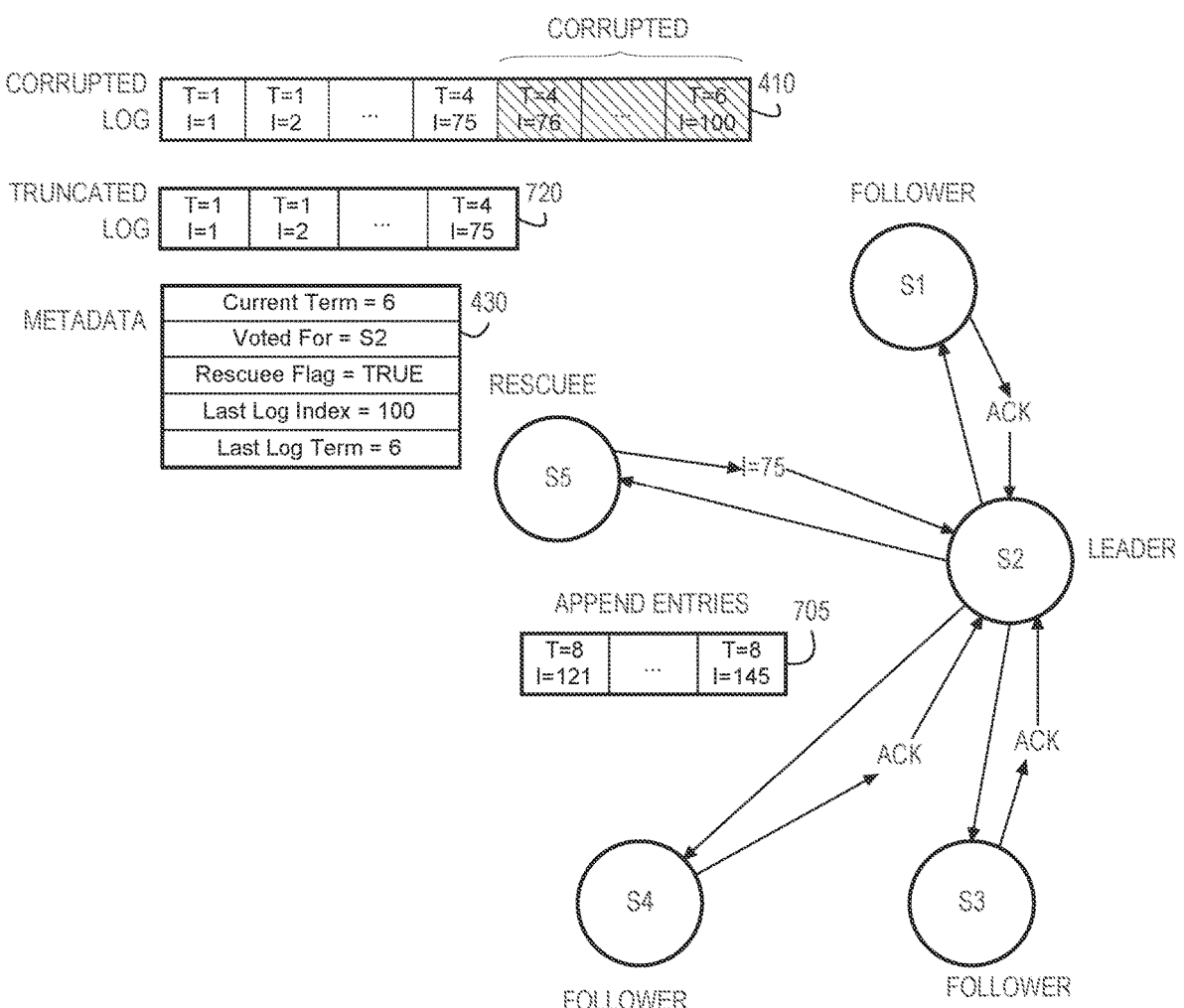
FIG. 7 is a block diagram illustrating automated log recovery in a distributed computing system in accordance with a consensus protocol in which aspects of the illustrative embodiments may be implemented.

FIG. 6 is a flowchart illustrating operation of a server performing automatic recovery of corrupted log entries in accordance with an illustrative embodiment. Operation begins when a server detects a corruption in its log (block 600). In one embodiment, the server creates a backup of the corrupted log (block 601). FIG. 7 is a block diagram illustrating automated log recovery in a distributed computing system in accordance with a consensus protocol in which aspects of the illustrative embodiments may be implemented. The distributed computing system includes five servers S1, S2, S3, S4, S5. In the depicted example, server S2 is the leader and servers S1, S3, S4 are followers. Server S5 has detected a corruption in log 410. Thus, server S5 creates a backup of corrupted log 410.

The server then truncates the log to remove the first corrupted log entry and all subsequent log entries (block 602). Thus, in FIG. 7, server S5 truncates log 410 to remove the corrupted entries, resulting in truncated log 720. The server also converts to the rescuee role (block 603) and begins to listen for AppendEntries RPCs (block 604). As shown in FIG. 7, server S5 sets the rescuee flag to "TRUE" in metadata 430. The server determines whether an AppendEntries RPC is received (block 605). If the server does not receive an AppendEntries RPC (block 605: NO), then operation returns to block 604 to listen for AppendEntries RPCs.

As shown in FIG. 7, leader server S2 sends and AppendEntries RPC 705 to all followers S1, S3, S4 and rescuee S5. If the server receives an AppendEntries RPC (block 605: YES), then the server determines whether the term of the latest log entry in the AppendEntries RPC is greater than or equal to the last log term from the server's metadata (block 606). If the term of the latest log entry in the AppendEntries RPC is greater than or equal to the last log term from the server's metadata (block 606: YES), then the server determines whether the index of the latest log entry in the AppendEntries RPC is greater than the last log index from the server's metadata (block 607).

If the term of the AppendEntries RPC is not greater than or equal to the last log term from the server's metadata or the index of the latest log entry in the AppendEntries RPC is not greater than the last log index from the server's metadata, then the AppendEntries RPC is from a server whose log is not as advanced than the rescuee server's log, which is referred to as a "stale leader." If the term of the AppendEntries RPC is not greater than or equal to the last log term from the server's metadata (block 606: NO) or the index of the latest log entry in the AppendEntries RPC is not greater than the last log index from the server's metadata (block 607: NO), then the rescuee server returns an error to the leader (block 608), and operation returns to block 604 to listen for AppendEntries RPCs.

If the term of the AppendEntries RPC is greater than or equal to the last log term from the server's metadata (block 606: YES) and the index of the latest log entry in the AppendEntries RPC is greater than the last log index from the server's metadata (block 607: YES), then the server sending the AppendEntries RPC is at least as up to date as the rescuee server and is a valid leader. In this case, the rescuee server determines whether there is a gap between the truncated log and the log entries from the AppendEntries RPC (block 609). Each replicated log must contain the same log entries in the same order according to the log index. The rescuee server cannot append entries to the truncated log that will result in a gap in log entries.

An AppendEntries RPC includes one or more log entries to be appended to logs of the followers and the rescuee server. The truncated log ends with a log entry having a term of 4 and an index of 75. In the example shown in FIG. 7, AppendEntries RPC 705 has a plurality of new entries with a beginning log entry having a term of 8 and a log index of 121 and an ending entry having a term of 8 and a log index of 145. Thus, there is a gap between the truncated log 720 and AppendEntries RPC 705, because there is a gap between the last log index in the metadata 430 and the beginning entry of AppendEntries RPC 705 (i.e., the beginning entry of AppendEntries RPC 705 is greater than the last log index in the metadata plus one). If there is a gap (block 609: YES), then the rescuee server sends an indication of the last log index to the leader (block 610), and operation returns to block 604 to listen for AppendEntries RPCs. In the example shown in FIG. 7, rescuee server S5 sends the last log index (I=75) to the leader S2. In an alternate embodiment, the rescuee server sends the next log index (e.g., I=76) to the leader, thus requesting new log entries starting with the next log index. The leader S2 will respond by sending another AppendEntries RPC starting with log index 76.

In this case shown in FIG. 7, the followers S1, S3, S4 can acknowledge AppendEntries RPC 705, and leader S2 can get consensus. Rescuee S5 will not be a part of the consensus. The next AppendEntries RPC may be for the leader S2 to catch rescuee S5 up to the rest of the cluster. This is similar to the process for a follower server that falls behind and is put into catchup mode. For example, when a server is added to the replication cluster, the new server will have an empty log and will require one or more AppendEntries RPCs to catch up to the other servers. In one embodiment, leader server S2 sends the subsequent AppendEntries RPC with log entries ranging from log index 76 to log index 145 to all servers in the cluster or to only rescuee server S5.

It is also possible for an AppendEntries RPC to overlap with the truncated log 720. In this case, rescuee server S5 may add only the new log entries to the log. In some cases, an AppendEntries RPC can include log entries that conflicts with an existing entry in the log, in which case the server deletes the existing entry and all entries that follow it. Alternatively, the server can overwrite existing log entries with the new log entries from an AppendEntries RPC.

If there is no gap between the truncated log and the log entries from the AppendEntries RPC (block 609: NO) (i.e., the beginning entry of AppendEntries RPC 705 is less than or equal to the last log index in the metadata plus one), then the rescuee server appends the entries from the AppendEntries RPC to the truncated log (block 611). Presumably, appending the entries to the rescuee server's log restores the corrupted log entries, because the AppendEntries RPC is from a server that is at least as up to date as the rescuee server and there is no gap between the truncated log and the AppendEntries RPC. The server also updates the last log index and last log term in the metadata 430. Therefore, with the log restored, the server converts to follower (block 612) and sets the rescuee flag to "FALSE" in the metadata 430. Thereafter, operation ends (block 613). The server may also remove the backup of the corrupted log created in block 601.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
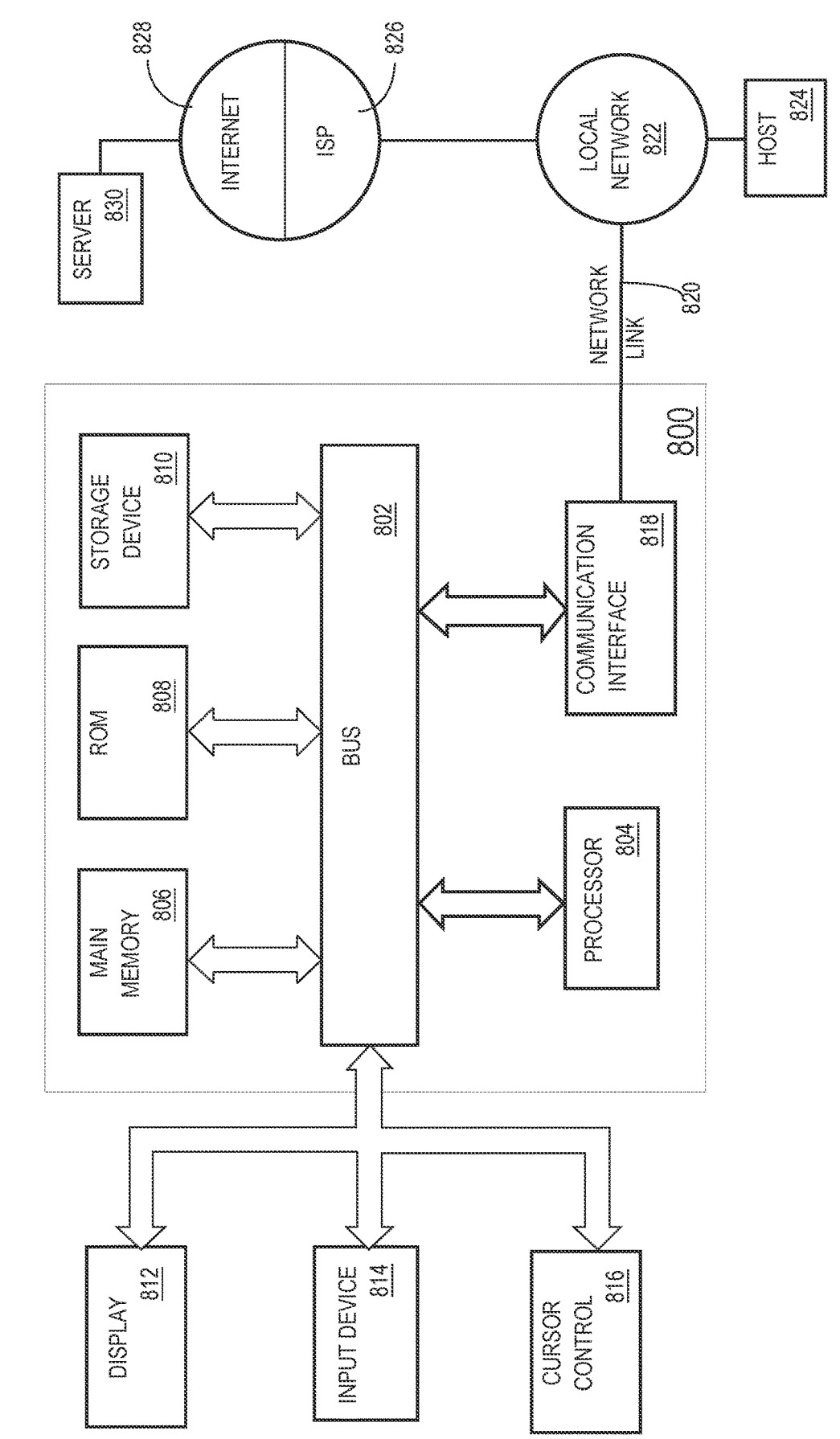
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world-wide packet data communication network now commonly referred to as the "Internet" 828. Local network 822 and Internet 828 both use electrical, electromagnetic, or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Over View

FIG. 9 is a block diagram of a basic software system 900 that may be employed for controlling the operation of computer system 900. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

performing, by a particular server in a replication group of servers, a recovery of data corruption of one or more log entries within a log, wherein:

each server within the replication group of servers stores a respective copy of the log, the replication group of servers includes a leader server in a leadership role and one or more follower servers in a follower role, the leader server is configured to replicate log changes to the one or more follower servers, the particular server stores metadata comprising a last log index and a last log term of a last entry appended to the copy of the log at the particular server prior to the recovery of the one or more log entries, and performing the recovery of the one or more log entries comprises:

truncating the one or more log entries from the copy of the log at the particular server to form a truncated log; and applying one or more append entries calls received from the leader server to append log entries to the truncated log based on the last log index and the last log term in the metadata, wherein the method is performed by one or more computing devices.

2. The method of claim 1, wherein:

performing the recovery of the one or more log entries further comprises converting to a rescuee role, and the particular server does not start a leadership election or participate in a leadership election while in the rescuee role.

3. The method of claim 2, wherein performing the recovery of the one or more log entries further comprises converting the particular server from the rescuee role to the follower role in response to the copy of the log at the particular server being recovered.

4. The method of claim 1, wherein applying one or more append entries calls comprises:

in response to receiving a given append entries call, determining that an index associated with the given append entries call is more advanced than the last log index in the metadata and a term associated with the given append entries call is at least as advanced as the last log term in the metadata; and in response to the index associated with the given append entries call being more advanced than the last log index in the metadata and the term associated with the given append entries call being at least as advanced as the last log term in the metadata, applying the given append entries call.

5. The method of claim 4, wherein applying one or more append entries calls further comprises:

in response to receiving a given append entries call, determining that the last index or the last term in the metadata is more advanced than the index or term associated with the given append entries call; and in response to the last index or the last term in the metadata being more advanced than the index or term associated with the given append entries call, rejecting the given append entries call.

6. The method of claim 1, wherein truncating the one or more log entries from the copy of the log at the particular server comprises:

identifying a first corrupted log entry in the copy of the log at the particular server; and truncating the first corrupted log entry and each subsequent log entry from the copy of the log at the particular server to form the truncated log.

7. The method of claim 6, wherein applying one or more append entries calls comprises:

receiving a given append entries call from the leader server, wherein the given append entries call includes a range of new log entries from a beginning index to an ending index; and in response to the beginning index being less than or equal to a last index in the truncated log plus one, applying the given append entries call.

8. The method of claim 6, wherein applying one or more append entries calls further comprises:

receiving a given append entries call from the leader server, wherein the given append entries call includes a range of new log entries from a beginning index to an ending index;

in response to the beginning index being greater than a last index in the truncated log plus one, sending the last index in the truncated log to the leader server;

receiving a subsequent append entries call from the leader server, wherein the subsequent append entries call includes a range of new log entries based on the last index in the truncated log; and applying the subsequent append entries call.

9. The method of claim 6, wherein the first corrupted log entry is identified based on at least one of:

a checksum of the first corrupted log entry, or a length of the first corrupted log entry.

10. The method of claim 1, wherein performing the recovery of the one or more log entries comprises creating a backup of persisted log entries in the copy of the log at the particular server.

11. One or more non-transitory storage media storing instructions which, when executed by one or more computing devices, cause:

performing, by a particular server in a replication group of servers, a recovery of data corruption of one or more log entries within a log, wherein:

each server within the replication group of servers stores a respective copy of the log, the replication group of servers includes a leader server in a leadership role and one or more follower servers in a follower role, the leader server is configured to replicate log changes to the one or more follower servers, the particular server stores metadata comprising a last log index and a last log term of a last entry appended to the copy of the log at the particular server prior to the recovery of the one or more log entries, and performing the recovery of the one or more log entries comprises:

truncating the one or more log entries from the copy of the log at the particular server to form a truncated log; and applying one or more append entries calls received from the leader server to append log entries to the truncated log based on the last log index and the last log term in the metadata.

12. The one or more non-transitory storage media of claim 11, wherein:

performing the recovery of the one or more log entries further comprises converting to a rescuee role, and the particular server does not start a leadership election or participate in a leadership election while in the rescuee role.

13. The one or more non-transitory storage media of claim 12, wherein performing the recovery of the one or more log entries further comprises converting the particular server from the rescuee role to the follower role in response to the copy of the log at the particular server being recovered.

14. The one or more non-transitory storage media of claim 11, wherein applying one or more append entries calls comprises:

in response to receiving a given append entries call, determining that an index associated with the given append entries call is more advanced than the last log index in the metadata and a term associated with the given append entries call is at least as advanced as the last log term in the metadata; and in response to the index associated with the given append entries call being more advanced than the last log index in the metadata and the term associated with the given append entries call being at least as advanced as the last log term in the metadata, applying the given append entries call.

15. The one or more non-transitory storage media of claim 14, wherein applying one or more append entries calls further comprises:

in response to receiving a given append entries call, determining that an index associated with the given append entries call is more advanced than the last log index in the metadata and a term associated with the given append entries call is at least as advanced as the last term in the metadata; and in response to the last log index or the last term in the metadata being more advanced than the index or term associated with the given append entries call, rejecting the one or more append entries call.

16. The one or more non-transitory storage media of claim 11, wherein truncating the one or more log entries from the copy of the log at the particular server comprises:

identifying a first corrupted log entry in the copy of the log at the particular server; and truncating the first corrupted log entry and each subsequent log entry from the copy of the log at the particular server to form the truncated log.

17. The one or more non-transitory storage media of claim 16, wherein applying one or more append entries calls comprises:

receiving a given append entries call from the leader server, wherein the given append entries call includes a range of new log entries from a beginning index to an ending index; and in response to the beginning index being less than or equal to a last index in the truncated log plus one, applying the given append entries call.

18. The one or more non-transitory storage media of claim 16, wherein applying one or more append entries calls further comprises:

receiving a given append entries call from the leader server, wherein the given append entries call includes a range of new log entries from a beginning index to an ending index;

in response to the beginning index being greater than a last index in the truncated log plus one, sending the last index in the truncated log to the leader server;

receiving a subsequent append entries call from the leader server, wherein the subsequent append entries call includes a range of new log entries based on the last index in the truncated log; and applying the subsequent append entries call.

19. The one or more non-transitory storage media of claim 16, wherein the first corrupted log entry is identified based on at least one of:

a checksum of the first corrupted log entry, or a length of the first corrupted log entry.

20. The one or more non-transitory storage media of claim 11, wherein performing the recovery of the one or more log entries comprises creating a backup of persisted log entries in the copy of the log at the particular server.

* * * * *